Dec. 20, 1960  W. W. JUKKOLA  2,965,449
HEAT RECOVERY IN FLUOSOLIDS PROCESS
Filed Oct. 29, 1956
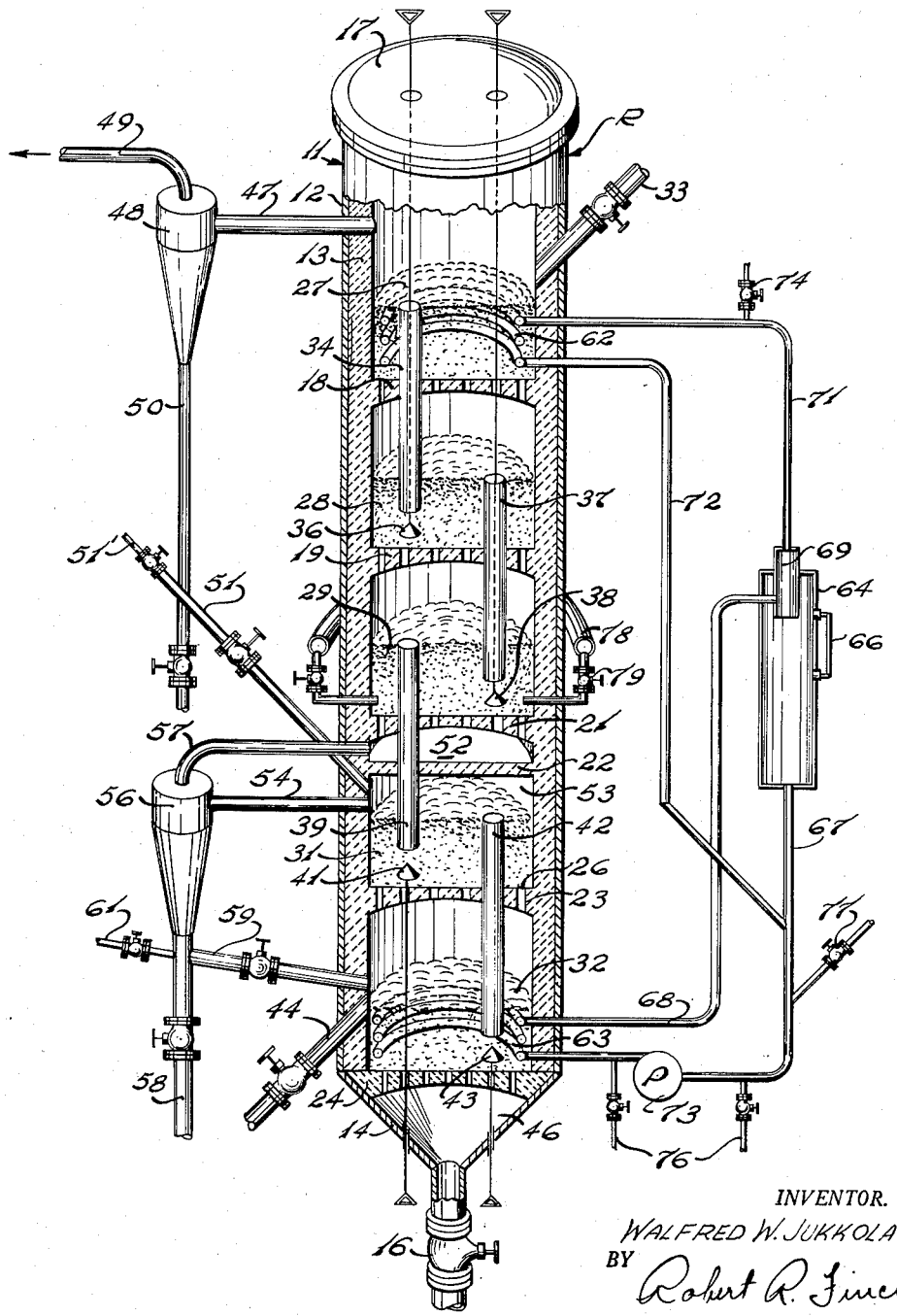
INVENTOR.
WALFRED W. JUKKOLA
BY
Robert R. Finch
Attorney

2,965,449

HEAT RECOVERY IN FLUOSOLIDS PROCESS

Walfred W. Jukkola, Westport, Conn., assignor to Dorr-Oliver Incorporated, Stamford, Conn., a corporation of Delaware Filed Oct. 29, 1956, Ser. No. 618,902

4 Claims. (Cl. 23—200)

This invention relates generally to the contacting of finely divided solids with gases in accordance with the so-called fluidized solids technique. More particularly, it relates to improved ways and means for more efficiently utilizing the heat added to or generated by such processes to thereby minimize fuel requirements and render the operation more nearly autogenous.

It is therefore an object of this invention to provide a heat recovery system whereby sensible heat of already reacted solids is efficiently utilized to preheat incoming solids prior to their reaction.

It is a further object to provide a system as above described in which a confined constantly circulating quantity of vapor, such as saturated steam, under pressure is employed as a heat carrying medium and from which heat is efficiently extracted by condensation in heat exchange relationship with incoming feed solids to thereby preheat such solids with latent heat of vaporization.

Other and more specific objects will become apparent as this specification proceeds.

In the drawing there is shown a partial sectional view of an embodiment of the invention, certain elements of the equipment being shown in elevation for purposes of clarity.

In the embodiment illustrated the reactor R comprises a vertical shell 11 having an outer steel wall 12 and lined with refractory material 13. Such reactor is closed at the bottom with a coned section 14 equipped with a suitable cleanout valve 16, and at the top with a cover plate 17.

The reactor is divided into a plurality of superimposed reaction compartments by means of transversely extending partitions 18, 19, 21, 22, 23 and 24. Of such partitions, 18, 19, 21, 23 and 24 are gas permeable partitions, referred to as constriction plates, through which fluidizing gas passes through suitable passages 26 and on which fluidized masses of solids 27, 28, 29, 31 and 32 are supported for reaction. The remaining transverse plate 22 is a gas impervious plate and serves as part of a system for preventing dust laden gases exiting from bed 31 from entering bed 29, as hereinafter described in greater detail.

Solids are supplied to the reactor via a valved conduit 33 into uppermost bed 27 from which they overflow via a transfer conduit 34 into the next lower bed 28. Transfer conduit 34 is provided with a suitable cone valve 36 which serves to maintain the flow of solids and minimize gas passage upwardly through conduit 34. From bed 28 solids are overflowed through a second transfer conduit 37 into a further subjacent bed 29, conduit 37 also having a cone valve 38. From bed 29 solids are further transferred via transfer conduit 39 (and cone valve 41) into the next lower bed 31 whence they are further transferred via a fourth transfer conduit 42 (and valve 43) into a final solids cooling bed 32 from which they are finally discharged via a conventional valved discharge conduit 44.

Coned bottom section 14 and lower transverse partition 24 together form a plenum space or windbox 46. Fluidizing and/or treatment gases are supplied to the reactor via valve conduit 16 which delivers such gas into windbox 46 whence it flows successively upwardly through the various compartments of the reactor to finally exit via conduit 47 into a dust separator 48 where entrained solids are separated from the gas, the solids-free gases being discharged via conduit 49 which separated solids are discharged via a tail pipe 50 to other process or into a lower bed of the reactor via valved conduit 51 and airlance 51'.

As shown in the drawing, solid transverse plate 22 is spaced below constriction plate 21 in such a manner as to define a second windbox 52 so that dust-laden gases discharging from a freeboard space 53 overlying bed 31 are by-passed via a conduit 54 into a dust separator 56 where entrained solids are removed before such gases are passed via conduit 57 into plenum space 52 for subsequent passage through the remaining chambers of the reactor. This is an important step in certain processes, such as iron ore reduction, carried out in the illustrated embodiment because in such a process bed 31 is a reaction bed where iron ore solids are reduced. Hence solids leaving such bed by entrainment in the gas stream are fully treated solids which should be recovered as product rather than being subjected to oxidizing conditions in superimposed combustion bed 29.

Solids collected in dust separator 56 may be discharged directly as product via valved tail pipe 58 or transferred via valved conduit 59 and airlance 61 into cooling bed 32 to effect recovery of sensible heat in the manner described below.

The heat recovery and utilization system of the present invention is incorporated in the arrangement of coils 62 in the upper bed and coils 63 in the lower bed which are joined together by an interconnecting conduit system more fully described below. The embodiment illustrated is, as noted above, adapted to carry out the endothermic reduction of ferric oxide to ferrosoferric oxide in accordance generally with the process disclosed in U.S. Patent No. 2,477,454 in which solids to be reduced enter one or more upper or initial beds (27 and 28) from which they are transferred to an intermediate bed (29) where combustion of combustible constituents in the fluidizing gas occurs to heat the solids to a reducing temperature, usually in excess of 950° F. Heated solids are then transferred to a lower bed (31) where they are reduced by action of reducing constituents in the incoming fluidizing gas which has the required reduction potential, and reduced solids are discharged as product. In such a process, hot gases uprising from the combustion zone serve to preheat incoming solids in the uppermost bed while the cold incoming gases are themselves preheated to a degree by contact with product solids in a solids cooling bed (32) following the reduction bed.

Although the above described prior multi-stage process does effect some sensible heat recovery by the countercurrent gas-solids flow, there is still a considerable quantity of sensible heat lost in product solids discharged from the system since the incoming gas can pick up only a minor portion of such heat.

In accordance with the present invention a large percentage of such heretofore wasted sensible heat is recovered in usable form by the novel steps of absorbing sensible heat from such product solids through coils to thereby generate pressured saturated steam or an equivalent vapor, such steam being then passed through coils in the uppermost bed in contact with cool incoming feed solids which, by virtue of their lower temperature cause condensation of such steam with the concomittant release of latent heat of vaporization. Thus, a considerable quantity of heat is liberated in the preheating bed with only a minor temperature drop of the vapor.

As shown in the drawing, a constantly circulating heat carrying system is formed from the combination of interconnected coils 62 and 63 together with reservoir 64 which is desirably employed as a steam and condensate reservoir. Water from reservoir 64, the level of which is sensed by a suitable level indicator 66, passes downwardly through condensate conduit 67 to enter lower coil 63 in the fluidized solids cooling bed 32. Solids entering this bed are those discharged directly from reduction bed 31, and in an iron ore reduction process, are at a temperature of approximately 1200° F. In bed 32, sufficient sensible heat from the solids is absorbed through coils 63 to convert the condensate therein to pressured saturated steam which passes, via a conduit 68, through outlet cylinder 69, in reservoir 64 from which it passes through conduit 71 into upper coils 62 where it comes in contact with the relatively cool bed 27 of incoming solids. This causes a drop in temperature with resulting condensation of steam and liberation of latent heat of vaporization. The result is liberation of a large quantity of heat with a relatively small temperature drop, thus providing an extremely efficient method of imparting heat to incoming solids in preheating bed 27. Condensed steam in coil 62 discharges, still under pressure, via conduit 72 to rejoin condensate conduit 67 for recycle through lower coil 63 where it absorbs sensible heat in sufficient quantity to revaporize.

Controlled flow of steam and condensate through the system is insured by means of a conventional pump schematically shown at 73. A suitable pressure relief valve 74 and drain valves 76 are provided for use in conventional manner. A valved conduit 77 is provided to permit the addition of makeup water to compensate for water lost from the system or for refilling the system after draining.

In operation for the reduction of iron ore, upper beds 27 and 28 are solids preheating beds, while intermediate bed 29 is a combustion chamber in which residual combustible constituents of the reducing gas is burned, air to support such burning being supplied by means of a manifold 78 and valved supply lines 79. If desired, additional fuel may be introduced along with such combustion supporting air.

Bed 31, directly below combustion bed 29, is an ore reduction bed in which the reduction of iron ore from hematite to magnetite is carried out. Reduced ore is transferred to the cooling bed 32 where it is cooled by the combined action of the uprising gas streams and the cooling action of coils 63 following which it is discharged as product.

In a typical operation, the combustion zone is operated at a temperature of 1400° F., the reduction zone is maintained at approximately 1200° F. and the lower solids cooling bed 32 is maintained at a temperature of approximately 800° F. Using two preheating beds, 27 and 28, and circulating steam and condensate through the system at a rate sufficient to maintain approximately 500° F. steam under pressure of 700 p.s.i.a., the uppermost preheating bed may be maintained at a temperature of approximately 240° F., which in turn enables the second preheating chamber to be maintained at a temperature of approximately 650° F. Of course suitable regulation of solids throughput, fuel supply and steam recycle must be maintained but this will be easily determined by simple tests in any given system.

As an example of the economies effected by practice of the present invention consider a five compartment reactor (as in the drawing) having an internal diameter in the combustion chamber of 22 feet and designed to operate at temperatures as follows: (a) first preheat (steam condensing) bed (27) at 240° F.; (b) second, preheat bed (28) at 650° F.; (c) combustion bed (29) at 1400° F.; (d) reduction bed (31) at 1200° F.; and solids cooling (steam generation) bed (32) at 800° F.

Employing the concept of the present invention such reactor has a capacity of 2360 tons of dry iron ore feed per day and requires the addition of heat, in the form of fuel supplied to the combustion chamber, of 707,200 B.t.u./ton of feed in order to maintain temperature of 1400° F. in the combustion chamber so that a 1200° F. reduction bed can be maintained.

In the same reactor, but without employing the heat recovery system of the present invention, it is necessary to add 816,000 B.t.u./ton of feed to the combustion bed in order to maintain the desired 1200° F. in the reduction bed.

Obviously, the fuel savings effected by the invention are considerable, being on the order of 108,000 B.t.u. per ton. Moreover, since the ore is more efficiently preheated in accordance with the invention, the time required for treatment is also reduced as is demonstrated by the above discussion in which employment of the invention enables the reactor to operate at a capacity of 2360 tons (dry feed)/day whereas the same reactor, without the invention, has a capacity of only 2040 tons (dry feed)/day. Thus, the invention not only saves about 14% in fuel, but also increases capacity about the same amount thereby further reducing the cost per ton of ore treated.

Although the invention has been herein described with particular reference to the endothermic reduction of hematite to magnetite utilizing added fuel as a source of heat, it is to be understood that it may be adapted to other endothermic reactions and also in exothermic reactions wherein the heat of reaction is insufficient in itself to maintain a single fluidized bed in autogenous operation. In the latter case, in addition to a reaction bed, a preheating bed would be employed as well as a cooling bed. Such additional beds would be located one on either side of the reaction bed and coils, such as 62 and 63, would be positioned therein. Thus incoming solids would be preheated, thereby reducing the B.t.u. requirement to elevate and maintain such solids at reduction temperature in the intermediate bed.

As previously discussed, the present invention makes large quantities of heat available to preheat the incoming feed solids yet requires only a small temperature drop to accomplish this. However, even though the required temperature drop is small, it is highly desirable that a relatively large temperature differential exist between the preheat bed solids and the vapor or steam entering such bed as this insures rapid condensation of such vapor and enables relatively high flow rates. Also, it is important that the vapor and/or condensate be confined during circulation in order to maintain pressure and thus higher temperatures in the vapor system. In connection with pressure, it is to be noted that the entire vapor-condensate system will be under substantially equal pressure at all times thus enabling circulation with a minimum of effort.

The exact pressures and temperatures employed in the system will of course depend upon conditions existing within any given reactor but these can be readily determined empirically by any skilled worker in the field, bearing in mind, of course, that the heat transfer coefficient of materials used as well as the solids throughput rate and vapor-condensate flow rate will all affect the operation.

In addition to the latent heat of vaporization liberated in the solids preheat bed, there will also be some sensible heat transfer from condensate in coils 62 to the solids. However, this is small compared to the major heat source and is therefore ignored for purposes of this specification.

As used in this specification and in the claims, the term "heat generating zone" or "active heating zone" applies to any zone in which heat is generated either by exothermic reaction or by compustion of added fuel while the term "combustion zone" refers to a zone in which heat generation is solely due to combustion of added fuel. The term "reaction zone" or "reducing zone" refers to a zone in which the actual reaction occurs.

I claim:

1. A process for effecting the reduction to magnetite of finely divided iron ore solids in a fluidized state by treatment in a multi-stage fluidized solids system, which comprises; maintaining an initial preheating bed of iron ore solids in a fluidized state while continuously feeding such solids thereto for preheating to an initial temperature adapted to effect condensation under pressure of a confined vaporizable liquid medium referred to below; maintaining a heat generating pre-heating bed of iron ore solids in a fluidized state derived continuously from said initial preheating bed for heating to a high temperature at least as high as the optimum reducing temperature by the combustion of residual reducing gas preparatory to reducing treatment proper; maintaining a reducing bed of solids in a fluidized state transferred thereto continuously from said heat generating bed, for effecting the reduction of said iron ore solids to magnetite at said optimum reducing temperature; maintaining at least one receiving bed of reduced solids in a fluidized state transferred thereto continuously from said reducing bed, while continuously discharging such solids from said receiving bed at a lowered discharge temperature; continuously passing a reducing gas under pressure upflowing through said receiving bed at a rate effective to maintain the fluidized state thereof, passing the thus preheated reducing gas from the receiving bed upflowing through the reducing bed at a rate effective to maintain the fluidized state thereof, and reacting said preheated reducing gas with the ore solids reducing them to magnetite, passing the hot spent reducing gases containing a residual portion of reducing gas from the reducing bed upflowing through said heat generating bed while introducing air to effect combustion of said residual portion of reducing gas for establishing and maintaining said high temperature in this bed, with the flow rate of the resulting hot spent gases through the bed such as to maintain the fluidized state thereof; passing said resulting hot spent gases from the heat generating bed upflowing through said initial preheating bed at a rate effective to maintain the fluidized state thereof; cooling the solids in the receiving bed by indirect heat exchange relationship with a liquid medium confined under pressure and adapted to be vaporized by heat abstracted from said bed to generate a pressured vapor thus cooling said bed by reduction of its heat content to the extent at least equal to the vaporization heat to a temperature above the vaporization temperature at said pressure, transferring such vapor into indirect heat exchange relationship with the initial preheating bed while maintaining a pressure corresponding to a vapor condensation temperature above that to which the initial bed is preheated by the latent heat liberated by vapor condensation; and recirculating the resulting condensate under pressure to said receiving bed for re-vaporization.

2. A process for effecting the reduction to magnetite of finely divided iron ore solids in a fluidized state by treatment in a multi-stage fluidized solids system, which comprises: maintaining an initial preheating bed of iron ore solids in a fluidized state while continuously feeding such solids thereto for preheating to an initial temperature adapted to effect condensation under pressure of a confined vaporizable liquid medium referred to below; maintaining at least one intermediate preheating bed of iron ore solids in a fluidized state transferred hereto continuously from said initial bed for further preheating to an intermediate temperature; maintaining a heat generating pre-heating bed of iron ore solids in a fluidized state derived continuously from said initial preheating bed for heating to a high temperature at least as high as the optimum reducing temperature by the combustion of residual reducing gas preparatory to reducing treatment proper; maintaining a reducing bed of solids in a fluidized state transferred thereto continuously from said heat generating bed, for effecting the reduction of said iron ore solids to magnetite at said optimum reducing temperature; maintaining at least one receiving bed of reduced solids in a fluidized state transferred thereto continuously from said reducing bed, while continuously discharging such solids from said receiving bed at a lowered discharge temperature; continuously passing a reducing gas under pressure upflowing through said receiving bed at a rate effective to maintain the fluidized state thereof, passing the thus preheated reducing gas from the receiving bed upflowing through the reducing bed at a rate effective to maintain the fluidized state thereof, and reacting the preheated reducing gas with the ore solids reducing them to magnetite, passing the hot spent reducing gases containing a residual portion of reducing gas from the reducing bed upflowing through said heat generating bed while introducing air to effect combustion of said residual portion of reducing gas for establishing and maintaining said high temperature in this bed, with the flow rate of the resulting hot spent gases through the bed such as to maintain the fluidized state thereof, passing said resulting hot spent gases from the heat generating bed upflowing through said intermediate preheating bed at a rate effective to maintain the fluidized state thereof, establishing therein said intermediate temperature; passing the spent gases from said intermediate preheating bed upflowing through said initial preheating bed at a rate effective to maintain the fluidized state thereof, establishing therein said initial temperature, cooling the solids in the receiving bed by indirect heat exchange relationship with a liquid medium confined under pressure adapted to be vaporized by heat abstracted from said bed to generate a pressured vapor thus cooling said bed by reduction of its heat content to the extent at least equal to the vaporization heat to a temperature above the vaporization temperature at said pressure, transferring such vapor into indirect heat exchange relationship with the initial preheating bed while maintaining a pressure corresponding to a vapor condensation temperature above that to which the initial bed is preheated by the latent heat liberated by vapor condensation; and recirculating the resulting condensate under pressure to said receiving bed for re-vaporization.

3. A vertical multi-stage fluidized solids reactor for effecting the reducing treatment of finely divided iron ore solids to magnetite in a fluidized state by means of a reducing gas, which comprises: an initial preheating chamber for containing a bed of iron ore solids in a fluidized state, provided with means for continuously feeding such solids thereto; at least one next lower intermediate preheating chamber for containing a bed of iron ore solids in a fluidized state continuously supplied thereto from the initial bed above; a next lower heat generating chamber for containing a heat generating bed of iron ore solids in a fluidized state supplied thereto continuously from the intermediate preheating bed above, provided with controllable means for supplying combustion air to said bed; a next lower reducing chamber for containing a reducing bed of solids in a fluidized state supplied thereto from said heat generating bed above; a next lower receiving chamber for containing a bed of reduced solids in a fluidized state supplied thereto from the reducing bed above; gas transfer conduit means between the respective chambers whereby treatment gases may pass upwardly sequentially through said chambers counter-current to the downward passage of the solids through the reactor controllable means for supplying reducing gas under pressure to the bed of reduced solids fluidizing the same in said receiving chamber, and adapted to subsequently fluidize and react with the solids in the reducing chamber, the thus resulting partially spent reducing gas adapted to fluidize and heat the solids in the (heat generating) chamber to a high temperature while burning residual reducing gas therein, the thus resulting spent hot gas adapted to fluidize and heat the solids in said intermediate preheating chamber to an intermediate temperature, the thus resulting gas adapted to fluidize and heat the solids in the initial preheating chamber to an initial lower temperature; and a closed circuit vaporization-condensation heat exchange system for transferring heat from the bed in the receiving chamber to the bed in the initial preheating chamber, by way of a liquid medium confined under pressure in said system, adapted to be vaporized by heat from the bed in the receiving chamber and to be condensed by absorbing from the bed of solids in the initial preheating chamber the latent heat required for condensation at said pressure, said heat exchange system comprising a first indirect heat exchange element located in said receiving chamber, a second indirect heat exchange element located in said initial preheating chamber, a steam-water separator, steam conduit means connecting the separator to the inlet end of the second heat exchange element, steam-water conduit means connecting the exit end of the first heat exchange element to the separator, and condensate return conduit means leading from the exit end of the second heat exchange element to return the condensate to said first heat exchange element.

4. The reactor according to claim 3, wherein said heat exchange system further comprises a circulating pump provided in said condensate return conduit means whereby condensate from said separator is pumped into said first heat exchange element.

References Cited in the file of this patent

UNITED STATES PATENTS

| | | |
|---|---|---|
| 2,110,774 | Privitt | Mar. 8, 1938 |
| 2,477,454 | Heath | July 26, 1949 |
| 2,490,993 | Borcherding | Dec. 13, 1949 |
| 2,581,041 | Ogorzaly et al. | Jan. 1, 1952 |

UNITED STATES PATENT OFFICE
CERTIFICATION OF CORRECTION

Patent No. 2,965,449            December 20, 1960

Walfred W. Jukkola

It is hereby certified that error appears in the above numbered patent requiring correction and that the said Letters Patent should read as corrected below.

In the heading to the printed specification, line 2, and in the heading to the single sheet of drawing, line 2, title of invention, for "HEAT RECOVERY IN FLUOSOLIDS PROCESS", each occurrence, read -- HEAT RECOVERY IN FLUIDIZED SOLIDS PROCESS --.

Signed and sealed this 27th day of June 1961.

(SEAL)
Attest:

ERNEST W. SWIDER            DAVID L. LADD
Attesting Officer            Commissioner of Patents